United States Patent
Dahn et al.

(10) Patent No.: US 7,816,452 B2
(45) Date of Patent: Oct. 19, 2010

(54) AT LEAST TWO-STAGE PROCESS FOR PREPARING PROPYLENE POLYMER COMPOSITIONS

(75) Inventors: Ulrich Clemens Dahn, München (DE); Wolfgang Bidell, Rhode-St-Genese-Brussels (BE); Hans-Jürgen Zimmermann, Bensheim (DE); Joachim Roesch, Ludwigshafen (DE); Guenther Schweier, Friedelsheim (DE)

(73) Assignee: Basell Poliolifine Italia s.r.l., Milan (IT)

( * ) Notice: Subject to any disclaimer, the term of this patent is extended or adjusted under 35 U.S.C. 154(b) by 302 days.

(21) Appl. No.: 10/522,082

(22) PCT Filed: Jul. 23, 2003

(86) PCT No.: PCT/EP03/08258

§ 371 (c)(1),
(2), (4) Date: Jan. 21, 2005

(87) PCT Pub. No.: WO2004/011507

PCT Pub. Date: Feb. 5, 2004

(65) Prior Publication Data

US 2005/0239967 A1    Oct. 27, 2005

Related U.S. Application Data

(60) Provisional application No. 60/401,947, filed on Aug. 8, 2002.

(30) Foreign Application Priority Data

Jul. 24, 2002   (DE)  ................................ 102 33 700

(51) Int. Cl.
C08L 23/00 (2006.01)
C08L 23/04 (2006.01)
C08L 23/10 (2006.01)

(52) U.S. Cl. .................. 525/191; 525/240

(58) Field of Classification Search ................. 525/191, 525/240
See application file for complete search history.

(56) References Cited

U.S. PATENT DOCUMENTS

| 4,454,299 A  * | 6/1984 | Schweier et al. ............ 525/53 |
| 4,734,459 A    | 3/1988 | Cecchin et al. ............. 525/247 |
| 4,857,613 A    | 8/1989 | Zolk et al. .................. 526/128 |
| 5,280,074 A    | 1/1994 | Schreck et al. |
| 5,288,824 A    | 2/1994 | Kerth et al. ................. 526/128 |
| 5,648,422 A    | 7/1997 | Collina et al. |
| 6,028,140 A    | 2/2000 | Collina et al. |
| 6,174,969 B1   | 1/2001 | Kersting et al. |
| 6,593,442 B2   | 7/2003 | Bidell et al. |
| 7,196,140 B2 * | 3/2007 | Dahn et al. ................ 525/247 |
| 2002/0019488 A1 * | 2/2002 | Seelert et al. ............. 525/240 |

FOREIGN PATENT DOCUMENTS

| DE | 195 29 240 | 2/1997 |
| EP | 0045975 | 2/1982 |
| EP | 0045977 | 2/1982 |
| EP | 0086473 | 8/1983 |
| EP | 0171200 | 2/1986 |
| EP | 433990 | 6/1991 |
| EP | 603723 | 6/1994 |
| EP | 704463 | 4/1996 |
| EP | 792914 | 9/1997 |
| EP | 889064 | 1/1999 |
| EP | 918068 | 5/1999 |
| EP | 0976785 | 2/2000 |
| EP | 1110976 | 6/2001 |
| EP | 1211289 | 6/2002 |
| GB | 2111066 | 6/1983 |
| WO | 96/11218 | 4/1996 |
| WO | 0119915 | 3/2001 |
| WO | WO 01/19915 | * 3/2001 |

OTHER PUBLICATIONS

B. Monrabal, "Crystallization Analysis Fractionation: A New Technique for the Analysis of Branching Distribution in Polyolefins," *Journal of Applied Polymer Science*, vol. 52, p. 491-499 (1994).

* cited by examiner

*Primary Examiner*—Nathan M Nutter
(74) *Attorney, Agent, or Firm*—Jarrod N. Raphael; William R. Reid

(57) ABSTRACT

The present invention relates to a process for preparing propylene polymer compositions in at least two-stage process wherein, in a first stage, a propylene homopolymer or a propylene copolymer comprising propylene and at least a CZ-CIO-1-alkenes other than propylene, containing at least 85% by weight of propylene, is prepared by polymerization and, in a second stage, ethylene and at least a comonomer selected from propylene and C4-C,o1alkenes are polymerized to give an ethylene polymer, comprising at least 90% by weight of ethylene, wherein the amount of the ethylene polymer in the propylene polymer composition ranges from 10 to 50% by weight and the propylene polymer composition has a melt flow rate MFR, in accordance with ISO 1133 at 230° C. and 2.16 kg, of from 2 to 50 g/10 min.

10 Claims, No Drawings

AT LEAST TWO-STAGE PROCESS FOR PREPARING PROPYLENE POLYMER COMPOSITIONS

This application is the U.S. national phase of International Application PCT/EP2003/008258, filed Jul. 23, 2003, claiming priority to German Patent Application 102 33 700.4, filed Jul. 24, 2002, and the benefit under 35 U.S.C. 119(e) of U.S. Provisional Application No. 60/401,947, filed Aug. 8, 2002; the disclosures of International Application PCT/EP2003/008258, German Patent Application 102 33 700.4 and U.S. Provisional Application No. 60/401,947, each as filed, are incorporated herein by reference.

The present invention relates to a process for preparing propylene polymer compositions in an at least two-stage process wherein, in a first stage, a propylene homopolymer or a propylene copolymer comprising propylene and $C_2$-$C_{10}$-1-alkenes other than propylene and containing at least 85% by weight of propylene is prepared first by polymerization and, in a second stage, an ethylene polymer which comprises at least 90% by weight of ethylene and in whose preparation propylene and further $C_4$-$C_{10}$-1-alkenes can be used as comonomers is then polymerized on, with the proportion of the ethylene polymer in the propylene polymer composition being from 10 to 50% by weight and the propylene polymer composition having a melt flow rate, MFR, in accordance with ISO 1133 at 230° C. and 2.16 kg, from 2 to 50 g/10 min.

Furthermore, the present invention relates to propylene polymer compositions obtainable by the above process, to the use of the propylene polymer compositions for producing films, fibers or moldings, and to films, fibers or moldings comprising the propylene polymer compositions.

To improve the toughness of propylene polymers and in particular to improve the toughness in the temperature range below 0° C., it is customary to add polymers which are non-crystalline or have a low crystallinity, e.g. ethylene-propylene copolymers, as impact modifiers to propylene polymers. It has been found to be most economical if the impact-modified propylene polymers are prepared directly in a multistage polymerization process. Such products are referred to as high-impact propylene copolymers, as multiphase propylene copolymers, as heterophasic propylene copolymers or as propylene block copolymers. The less soft propylene polymer, which normally makes up the largest proportion by weight of the polymer composition, usually forms a physically coherent phase which is referred to as the matrix.

In such impact-modified polypropylenes, an improvement in toughness is generally associated with a reduction in stiffness, so that it is necessary to find a compromise between the two properties, namely the stiffness/toughness ratio. However, compared to propylene homopolymers, high-impact propylene copolymers have the disadvantage that the heat distortion resistance and the softening temperature are reduced, which restricts their use in particular applications. This is attributable to the presence of the ethylene-propylene copolymer serving as impact modifier.

High-impact polypropylene copolymers are opaque materials and cannot be used for applications which require transparent or translucent materials. In contrast, copolymers of propylene with α-olefins are transparent. In these, $C_2$-$C_{10}$-1-alkenes are generally used as α-olefins, usually in amounts of from about 1 to 10% by weight. However, this is associated with a significant reduction in the stiffness. Such copolymers still display a drastic decrease in toughness at temperatures below 0° C. By mixing impact modifiers, it possible to improve the low-temperature toughness without significantly worsening the transparency, but a further decrease in stiffness is then observed.

Attempts have also been made to prepare propylene polymers having altered properties by mixing polyethylene instead of fully or predominantly amorphous ethylene-propylene copolymers. EP-A 918 068 discloses blends of polypropylene and finely divided polyethylene for the production of stiff and transparent films. However, the polyethylene content does not exceed 10% by weight. EP-A 976 785 describes a mixture using high molecular weight polyethylene which is formed in a prepolymerization step and is mixed with homo-polypropylene and an ethylene-propylene copolymer. Advantages are a high melt strength, good transparency and good stress whitening behavior.

U.S. Pat. No. 4,734,459 describes propylene polymer compositions having good low-temperature impact toughness and good stress whitening behavior. The compositions are obtained in a two-stage polymerization process in which a polypropylene having an isotacticity index of >90 is first prepared by polymerization and an ethylene/1-butene copolymer containing from 50 to 95% by weight of ethylene is then polymerized onto it. Such propylene polymer compositions display better stress whitening behavior and a higher stiffness than propylene polymer compositions which are prepared in a comparable manner but in which ethylene/propylene copolymers containing from 57 to 88% by weight of ethylene are polymerized in the second stage.

EP-A 603 723 describes propylene polymer compositions comprising from 70 to 98% by weight of a propylene homopolymer or a propylene copolymer with from 0.5 to 10% by weight of comonomers and from 2 to 30% by weight of an elastomeric ethylene copolymer with one or more $C_4$-$C_{10}$-α-olefins containing from 60 to 85% by weight of ethylene. WO 01/19915 discloses propylene polymer compositions comprising from 60 to 95% by weight of a propylene homopolymer or a propylene copolymer with up to 15% by weight of comonomers, wherein this polymer being composed of two fractions having different melt flow rates, and from 5 to 40% by weight of an ethylene copolymer with one or more $C_4$-$C_{10}$-α-olefins containing from 10 to 40% by weight of comonomer. A disadvantage of these propylene polymer compositions is that it is necessary to use two monomers other than propylene in the polymerization in the second stage, which makes the overall production process less economical.

It is an object of the present invention to provide propylene polymer compositions which can be prepared economically, are suitable for the production of moldings, in particular by injection molding or by blow molding, and have a good low-temperature toughness combined with improved stiffness. In the case of propylene polymer compositions which have a propylene copolymer matrix, a high transparency should additionally be achieved. Furthermore, good thermo-mechanical properties, such as high heat distortion resistance or high softening temperature, and also a low tendency to stress whitening should be achieved.

We have found that this object is achieved by a process for preparing propylene polymer compositions in an at least two-stage process, wherein, in a first stage, a propylene homopolymer or a propylene copolymer comprising propylene and at least a $C_2$-$C_{10}$-1-alkenes other than propylene, containing at least 85% by weight of propylene is prepared by polymerization and, in a second stage, ethylene and at least a comonomer selected from propylene and $C_4$-$C_{10}$-1-alkenes are polymerized to give an ethylene polymer, comprising at least 90% by weight of ethylene, wherein the amount of the ethylene polymer in the propylene polymer composition ranges from 10 to 50% by weight and the propylene polymer composition has a melt flow rate MFR, in accordance with ISO 1133 at 230° C. and 2.16 kg, of from 2 to 50 g/10 min.

Furthermore, an object of the present invention are the propylene polymer compositions obtainable by such a process, the use of the propylene polymer compositions for producing films, fibers or moldings, and films, fibers and moldings comprising the propylene polymer compositions of the invention.

In the process of the present invention, at least two different polymers are prepared by polymerization in at least two stages. The polymer prepared in the first stage is a propylene homopolymer or a propylene copolymer comprising propylene and at least a $C_2$-$C_{10}$-1-alkene other than propylene and containing at least 85% by weight of propylene. For the purposes of the present invention, the expression $C_2$-$C_{10}$-1-alkenes other than propylene refers to branched and linear 1-alkenes, preferably linear, having from 2 to 10 carbon atoms, and preferably ethylene, 1-butene, 1-pentene, 1-hexene, 1-heptene, 1-octene and mixtures thereof. More preferably, the comonomer is ethylene or 1-butene. Preferred propylene polymers prepared in the first polymerization stage are propylene homopolymers or propylene copolymers comprising from 90 to 99.5% by weight, more preferably from 95 to 98% by weight of propylene and from 0.5 to 10% by weight, more preferably from 2 to 5% by weight of comonomer. Particularly preferred propylene copolymers are made up exclusively of the monomers propylene and ethylene.

The ethylene polymers produced in the second polymerization stage are preferably ethylene copolymers comprising at least 90% by weight, preferably from 95 to 99.5% by weight of ethylene and no more than 10% by weight, preferably from 0.5 to 5% by weight of comonomers. Suitable comonomers are selected from propylene and further $C_4$-$C_{10}$-1-alkenes, which may be linear or branched, preferably linear 1-alkenes having from 4 to 10 carbon atoms, and in particular 1-butene, 1-pentene, 1-hexene, 1-heptene, 1-octene and mixtures thereof.

Particularly preferred $C_4$-$C_{10}$-1-alkenes are 1-butene, 1-hexene and 1-octene. The propylene content in the ethylene polymers formed in the second stage is preferably greater than that of the $C_4$-$C_{10}$-1-alkenes and it is particularly preferred that the ethylene polymers are made up exclusively of the monomers propylene and ethylene. The proportion of the ethylene polymers formed in the second stage, based on the total propylene polymer composition, is from 10 to 50% by weight, preferably from 15 to 40% by weight, and more preferably from 18 to 30% by weight.

In the process of the present invention, the polymerization steps are usually carried out by means of a Ziegler-Natta catalyst system. In particular, use is made of catalyst systems which comprise a titanium-containing solid component a) together with cocatalysts in the form of organic aluminum compounds b) and electron donor compounds c). However, it is also possible to use catalyst systems based on metallocene compounds or polymerization-active metal complexes.

To prepare the titanium-containing solid component a) of the Ziegler-Natta catalyst systems commonly used, the halides or alkoxides of trivalent or tetravalent titanium are generally used as titanium compounds. Titanium alkoxide halide compounds or mixtures of various titanium compounds can also be used. Preference is given to titanium compounds in which chlorine is present as halogen. Preference is likewise given to the titanium halides containing only titanium and halogen, preferably titanium chlorides, and more preferably titanium tetrachloride.

The titanium-containing solid component a) preferably further comprises at least one halogen-containing magnesium compound. For the present purposes, halogens are chlorine, bromine, iodine and fluorine, with bromine being preferred and chlorine being particularly preferred. The halogen-containing magnesium compounds are either used directly in the preparation of the titanium-containing solid component a) or are formed in its preparation. Magnesium compounds suitable for the preparation of the titanium-containing solid component a) are especially the magnesium halides, in particular magnesium dichloride or magnesium dibromide, or magnesium compounds from which the halides can be obtained in a customary manner, e.g. by reaction with halogenating agents, for example magnesium alkyls, magnesium aryls, magnesium alkoxide or magnesium aryloxide compounds or Grignard compounds. Preferred examples of halogen-free compounds of magnesium which are suitable for the preparation of the titanium-containing solid component a) are n-butylethylmagnesium and n-butyloctylmagnesium. Preferred halogenating agents are chlorine and hydrogen chloride. However, the titanium halides can also serve as halogenating agents.

In addition, the titanium-containing solid component a) advantageously further comprises electron donor compounds, for example monofunctional or polyfunctional carboxylic acids, carboxylic anhydrides or carboxylic esters, also ketones, ethers, alcohols, lactones or organophosphorus or organosilicon compounds.

As electron donor compounds within the titanium-containing solid component, preference is given to carboxylic acid derivatives and in particular phthalic acid derivatives of the formula (I)

where X and Y are each a chlorine or bromine atom or a $C_1$-$C_{10}$-alkoxy radical or together represent oxygen in an anhydride function. Particularly preferred electron donor compounds are phthalic esters in which X and Y are each a $C_1$-$C_8$-alkoxy radical. Examples of preferred phthalic esters are diethyl phthalate, di-n-butyl phthalate, diisobutyl phthalate, di-n-pentyl phthalate, di-n-hexyl phthalate, di-n-heptyl phthalate, di-n-octyl phthalate or di-2-ethylhexyl phthalate.

Further preferred electron donor compounds within the titanium-containing solid component are diesters of 3- or 4-membered, substituted or unsubstituted cycloalkyl-1,2-dicarboxylic acids, and also monoesters of substituted benzophenone-2-carboxylic acids or substituted benzophenone-2-carboxylic acids themselves. Hydroxy compounds used for preparing these esters are the alkanols customary in esterification reactions, for example $C_1$-$C_{15}$-alkanols or $C_5$-$C_7$-cycloalkanols, which may in turn bear one or more $C_1$-$C_{10}$-alkyl groups, also $C_6$-$C_{10}$-phenols.

It is also possible to use mixtures of various electron donor compounds.

In the preparation of the titanium-containing solid component a), use is generally made of from 0.05 to 2.0 mol, preferably from 0.2 to 1.0 mol, of electron donor compounds per mol of the magnesium compounds.

In addition, the titanium-containing solid component a) may further comprise inorganic oxides as supports. In general, a finely divided inorganic oxide which has a mean particle diameter of from 5 to 200 μm, preferably from 20 to 70 μm, is used as support. For the purposes of the present invention, the mean particle diameter is the volume-based mean (median) of the particle size distribution determined by Coulter Counter analysis.

The particles of the finely divided inorganic oxide are preferably composed of primary particles which have a mean particle diameter of from 1 to 20 μm, in particular from 1 to 5 μm. The primary particles are porous, granular oxide particles which are generally obtained by milling a hydrogel of the inorganic oxide. It is also possible to sieve the primary particles before they are processed further.

Preferred inorganic oxides can, for example, be obtained by spray drying the milled hydrogel which for this purpose is mixed with water or an aliphatic alcohol. Such finely divided inorganic oxides are also commercially available.

Furthermore, the finely divided inorganic oxide usually has a pore volume of from 0.1 to 10 cm³/g, preferably from 1.0 to 4.0 cm³/g, and a specific surface area of from 10 to 1000 m²/g, preferably from 100 to 500 m²/g, with these values being those determined by mercury porosimetry in accordance with DIN 66133 and by nitrogen adsorption in accordance with DIN 66131.

Suitable inorganic oxides are, in particular, the oxides of silicon, aluminum, titanium or one of the metals of group 1 or 2 of the Periodic Table. Particularly preferred oxides are aluminum oxide, magnesium oxide and sheet silicates and especially silicon oxide, in particular in the form of a silica gel. It is also possible to use mixed oxides such as aluminum silicates or magnesium silicates.

The inorganic oxides used as supports have water present on their surface. This water is partly bound physically by adsorption and partly bound chemically in the form of hydroxyl groups. The water content of the inorganic oxide can be reduced or eliminated entirely by thermal or chemical treatment. In the case of a chemical treatment, use is generally made of customary desiccants such as $SiCl_4$, chlorosilanes or aluminum alkyls. The water content of suitable inorganic oxides is from 0 to 6% by weight. Preference is given to using an inorganic oxide in the form in which it is commercially available, without further treatment.

The magnesium compound and the inorganic oxide are preferably present in the titanium-containing solid component a) in such amounts that from 0.1 to 1.0 mol, in particular from 0.2 to 0.5 mol, of the magnesium compound is present per mol of the inorganic oxide. Furthermore, $C_1$-$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or mixtures thereof are generally used in the preparation of the titanium-containing solid component a). Preference is given to using ethanol.

The titanium-containing solid component can be prepared by methods known per se. Examples are described, for example, in EP-A 45 975, EP-A 45 977, EP-A 86 473, EP-A 171 200, GB-A 2 111 066, U.S. Pat. No. 4,857,613 and U.S. Pat. No. 5,288,824. The process known from DE-A 195 29 240 is preferably employed.

Aluminum compounds b) which are suitable as cocatalysts include both trialkylaluminums and also compounds of this type in which an alkyl group is replaced by an alkoxy group or by a halogen atom, for example chlorine or bromine. The alkyl groups can be identical or different. Linear or branched alkyl groups are possible. Preference is given to using trialkylaluminum compounds whose alkyl groups each have from 1 to 8 carbon atoms, for example trimethylaluminum, triethylaluminum, triisobutylaluminum, trioctylaluminum or methyldiethylaluminum or mixtures thereof.

Apart from the aluminum compound b), it is usual to use, as further cocatalyst, electron donor compounds c) such as monofunctional or polyfunctional carboxylic acids, carboxylic anhydrides or carboxylic esters, also ketones, ethers, alcohols, lactones and organophosphorus and organosilicon compounds, with the electron donor compounds c) being able to be identical to or different from the electron donor compounds used for preparing the titanium-containing solid component a). Preferred electron donor compounds as component c) are organosilicon compounds of the formula (II)

$$R^1_n Si(OR^2)_{4-n} \qquad (II)$$

where $R^1$ are identical or different and are each a $C_1$-$C_{20}$-alkyl group, a 5- to 7-membered cycloalkyl group which may in turn bear $C_1$-$C_{10}$-alkyl groups as substituents, a $C_6$-$C_{18}$-aryl group or a $C_6$-$C_{18}$-aryl-$C_1$-$C_{10}$-alkyl group, $R^2$ are identical or different and are each a $C_1$-$C_{20}$-alkyl group and n is 1, 2 or 3. Particular preference is given to compounds in which $R^1$ is a $C_1$-$C_8$-alkyl group or a 5- to 7-membered cycloalkyl group and $R^2$ is a $C_1$-$C_4$-alkyl group and n is 1 or 2.

Among these compounds, particular mention may be made of diisopropyldimethoxysilane, isobutylisopropyldimethoxysilane, diisobutyldimethoxysilane, dicyclopentyldimethoxysilane, dicyclohexyldimethoxysilane, cyclohexylmethyldimethoxysilane, isopropyl-tert-butyldimethoxysilane, isobutyl-sec-butyldimethoxysilane and isopropyl-sec-butyldimethoxysilane.

The cocatalysts b) and c) are preferably used in such amounts that the atomic ratio of aluminum from the aluminum compound b) to titanium from the titanium-containing solid component a) is from 10:1 to 800:1, in particular from 20:1 to 200:1, and the molar ratio of the aluminum compound b) to the electron donor compound c) is from 1:1 to 250:1, in particular from 10:1 to 80:1.

The titanium-containing solid component a) and the cocatalysts, viz. the aluminum compound b) and the electron donor compound c) which is generally used, together form the Ziegler-Natta catalyst system.

In the process of the present invention, catalyst systems based on metallocene compounds or polymerization-active metal complexes can also be used in the polymerization reactor. For the purposes of the present invention, metallocenes are complexes of metals of groups 3 to 12 of the Periodic Table with organic ligands, which complexes together with compounds capable of forming metallocenium ions give effective catalyst systems. For use in the process of the present invention, the metallocene complexes are generally present in supported form in the catalyst system. Supports used are frequently inorganic oxides. Preference is given to the above-described inorganic oxides which are also used for preparing the titanium-containing solid component a).

Metallocenes customarily used contain titanium, zirconium or hafnium as central atoms, with preference being given to zirconium. In general, the central atom is bound via a π bond to at least one, generally substituted, cyclopentadienyl group and to further substituents. The further substituents can be halogens, hydrogen or organic radicals, with preference being given to fluorine, chlorine, bromine or iodine or a $C_1$-$C_{10}$-alkyl group.

Preferred metallocenes contain central atoms which are bound via two π bonds to two substituted cyclopentadienyl groups, with particular preference being given to those in which substituents of the cyclopentadienyl groups are bound to both cyclopentadienyl groups. Especial preference is given to complexes whose cyclopentadienyl groups are additionally substituted by cyclic groups on two adjacent carbon atoms.

Preferred metallocenes also include compounds containing only one cyclopentadienyl group which is, however, substituted by a radical which is also bound to the central atom.

Examples of suitable metallocene compounds are ethylenebis(indenyl)zirconium dichloride, ethylenebis(tetrahydroindenyl)zirconium dichloride, diphenylmethylene-9-fluorenylcyclopentadienylzirconium dichloride, dimethylsilanediylbis(3-tert-butyl-5-methylcyclopentadienyl)zirconium dichloride, dimethylsilanediylbis(2-methylindenyl)zirconium dichloride, dimethylsilanediylbis(2-methylbenzindenyl)zirconium dichloride dimethylsilanediylbis (2-methyl-4-phenylindenyl)zirconium dichloride, dimethylsilanediylbis(2-methyl-4-naphthylindenyl)zirconium dichloride, dimethylsilanediylbis(2-methyl-4-isopropylindenyl)zirconium dichloride and dimethylsilanediylbis (2-methyl-4,6-isopropylindenyl)zirconium dichloride and also the corresponding dimethylzirconium compounds.

The metallocene compounds are either known or are obtainable by methods known per se. In addition, the metallocene catalyst systems further comprise compounds capable of forming metallocenium ions as cocatalysts. Suitable cocatalysts are strong, uncharged Lewis acids, ionic compounds having Lewis-acid cations or ionic compounds containing Brönsted acids as cation. Examples are tris(pentafluorophenyl)borane, tetrakis(pentafluorophenyl)borate or salts of N,N-dimethylanilinium. Open-chain or cyclic aluminoxane compounds are likewise suitable as compounds capable of forming metallocenium ions and thus as cocatalysts. These are usually prepared by reaction of trialkylaluminum with water and are generally in the form of mixtures of both linear and cyclic chain molecules of various lengths.

Furthermore, the metallocene catalyst systems can comprise organometallic compounds of the metals of groups 1, 2 and 13 of the Periodic Table, e.g. n-butyllithium, n-butyl-n-octylmagnesium or triisobutylaluminum, triethylaluminum or trimethylaluminum.

The process of the present invention comprises at least two successive polymerization stages, i.e. generally in the form of a reactor cascade. It is possible to use the customary reactors used for the polymerization of $C_2$-$C_{10}$-1-alkenes.

The polymerization can be carried out in a known manner in bulk, in suspension, in the gas phase or in a supercritical medium. It can be carried out batchwise or preferably continuously. Solution processes, suspension processes, stirred gas-phase processes or gas-phase fluidized-bed processes are all possible. As solvent or suspension medium, it is possible to use inert hydrocarbons, for example isobutane, or else the monomers themselves. It is also possible for one or more stages of the process of the present invention to be carried out in two or more reactors, for example the preparation of the propylene homopolymer or copolymer formed initially in a reactor cascade using different amounts of molecular weight regulator to achieve a broadening of the molecular weight distribution of this component. The size of the reactors is not of critical importance in the process of the present invention. It is determined by the output which is to be achieved in the reaction zone or in the individual reaction zones.

The process of the present invention can also comprise further stages in which further polyolefin polymers whose compositions differ from those of the first two stages are formed. The order of the stages is not critical for the process of the present invention, i.e. the individual components of the propylene polymer compositions can be formed by successive polymerization in any order, but preference is given to firstly preparing the propylene homopolymer or propylene copolymer in the polymerization stage designated as first stage and subsequently polymerizing the ethylene polymer onto this in the polymerization stage designated as second stage.

Preference is given to processes in which the polymerization in the second stage is carried out in gas phase. The previous polymerization of the propylene homopolymers or copolymers can be carried out either in bulk, i.e. in liquid propylene as suspension medium, or likewise in gas phase. If all the polymerization stages take place in gas phase, preference is given to employing a cascade of stirred gas-phase reactors which are connected in series and in which the reaction bed in powder form is kept in motion by means of a vertical stirrer. The reaction bed generally comprises the polymer which is polymerized in the respective reactor. If the polymerization of the propylene homopolymers or copolymers taking place initially is carried out in bulk, preference is given to employing a cascade comprising one or more loop reactors and one or more gas-phase fluidized-bed reactors. The preparation can also be carried out in a multizone reactor.

In a particularly preferred embodiment of the process of the present invention, use is made of a cascade of stirred gas-phase reactors which are connected in series and in which the reaction bed in powder form is kept in motion by means of a vertical stirrer. Reactors having free-standing helical stirrers are particularly useful for this purpose.

The preparation of the propylene homopolymers or propylene copolymers in the first polymerization stage of the process of the present invention is generally carried out under customary reaction conditions, preferably at a pressure of from 10 to 50 bar, more preferably from 15 to 40 bar, a temperature of from 50 to 100° C., more preferably from 60 to 90° C., and a mean residence time of from 0.3 to 5 hours, in particular from 0.8 to 4 hours, in the presence of a polymerization-active catalyst system.

The polymer obtained in the first polymerization stage is preferably introduced together with the catalyst system used into an intermediate vessel. Intermediate vessels used are the reactors or vessels commonly used for the polymerization of $C_2$-$C_{10}$-1-alkenes. Examples of suitable intermediate vessels are cylindrical vessels, stirred tanks or cyclones. In the intermediate vessel, the polymer discharged from the first polymerization stage is firstly depressurized to less than 5 bar, preferably less than 3.5 bar, for from 0.01 to 5 minutes, in particular from 0.2 to 4 minutes. During this time, from 0.001 g to 10 g, preferably from 0.001 g to 1.0 g, of a $C_1$-$C_8$-alkanol per kg of polymer are added to the propylene homopolymer or copolymer to achieve better regulation of the further polymerization behavior. Isopropanol is particularly useful for this purpose, but ethanol or glycol are also useful. The temperature of the intermediate vessel is usually from 10 to 80° C., in particular from 20 to 70° C. The pressure in the intermediate vessel is subsequently increased again from 5 to 60 bar, in particular from 10 to 50 bar, by injection of a gas mixture whose composition differs from the composition of the gas mixture of the first polymerization stage. The increase in pressure in the intermediate vessel is preferably achieved using a gas mixture which has the composition of the gas mixture of the second polymerization stage. The reaction mixture can also be reacted with conventional antistatics known in the state of the art, for example polyglycol ethers of fatty alcohols, fatty acids and alkylphenols, alkyl sulfates and alkylphosphates and also quaternary ammonium compounds, in the intermediate vessel.

The polymer containing the catalyst is then discharged from the intermediate vessel and introduced into the second polymerization stage. In the second polymerization stage, the ethylene polymer comprising at least 90% by weight of ethylene is then polymerized preferably at a pressure of from 10 to 50 bar, more preferably from 10 to 40 bar, at a temperature of from 50 to 100° C., more preferably from 60 to 90° C., and a mean residence time of from 0.5 to 5 hours, more preferably from 0.8 to 4 hours.

In the second polymerization stage, from 0.001 g to 10 g, in particular from 0.005 g to 0.5 g, of a $C_1$-$C_8$-alkanol, preferably isopropanol, glycol or ethanol, can be added per kg of propylene copolymer. This addition can be carried out in place of or in addition to the addition in the intermediate vessel.

The proportion of the ethylene polymer comprising at least 90% by weight of ethylene produced in the second polymerization stage is from 10 to 50% by weight, preferably from 12 to 40% by weight and more preferably from 15 to 30% by weight, based on the propylene polymer composition.

The molecular weight of the polymers prepared in the at least two-stage process of the present invention can be controlled and set by means of conventional regulators commonly known in polymerization technology, for example by means of hydrogen. A part from regulators, it is also possible to use catalyst activity modifiers, i.e. compounds which influence the catalyst activity. In addition, antistatics can be introduced not only into the intermediate vessel but also into the polymerization reactors.

The melt flow rate MFR in accordance with ISO 1133 at 230° C. and 2.16 kg of the propylene polymer compositions of the present invention is in the range from 2 to 50 g/10 min, preferably from 3 to 30 g/10 min. The melt flow rate of the polymer obtained in the first polymerization stage can be from 5 to 150 g/10 min, and the MFR of the ethylene polymer obtained in the second polymerization stage can independently vary in the range from 2 to 50 g/10 min.

In the propylene polymer compositions of the present invention, the ratio of the weight average molecular weight $M_w$ of the ethylene polymer formed in the second polymerization stage to the weight average molecular weight $M_w$ of the propylene homopolymer or propylene copolymer prepared in the first polymerization stage is preferably in the range from 1.1 to 7, more preferably from 1.4 to 5.

The propylene copolymer compositions of the present invention can be prepared economically and show a good combination of low-temperature toughness and stiffness. Furthermore, they have good thermomechanical properties, such as high heat distortion resistance or high softening temperature and a low tendency to stress whitening. The propylene copolymer compositions of the present invention in which the polymer prepared in the first polymerization stage is a propylene copolymer is additionally endowed with high transparency.

Furthermore, it has been found that the properties of the propylene polymer compositions of the present invention can be further improved, in particular when the polymer prepared in the first polymerization stage is a propylene copolymer, by addition to the ethylene polymer produced in the second stage of an ethylene-$C_3$-$C_{10}$-1-alkene copolymer having low crystallinity.

This can be carried out by polymerizing the ethylene-$C_3$-$C_{10}$-1-alkene copolymer onto the propylene polymer composition in a further polymerization stage, after the second polymerization stage. According to a different embodiment, an ethylene-$C_3$-$C_{10}$-1-alkene copolymer which has previously been prepared separately can be admixed with the propylene polymer composition in a further process step, in a conventional mixing apparatus such as an extruder, for example a twin-screw extruder, or a kneader.

Suitable ethylene-$C_3$-$C_{10}$-1-alkene copolymers which have a crystallinity lower than that of the ethylene polymer formed in the second stage are, for example, copolymers of ethylene comprising from 50 to 97 mol % of ethylene and from 3 to 50 mol % of $C_3$-$C_{10}$-1-alkenes. Preferred ethylene-$C_3$-$C_{10}$-1-alkene copolymers having a crystallinity lower than that of the ethylene polymer formed in the second stage are, for example, ethylene copolymers having a density of less than or equal to 0.91 g/cm$^3$. The average weight molecular weight $M_w$ of the ethylene-$C_3$-$C_{10}$-1-alkene copolymers is preferably from 20 000 to 250 000 g/mol, and more preferably from 100 000 to 200 000 g/mol.

The addition of the ethylene-$C_3$-$C_{10}$-1-alkene copolymer generally improves the impact strength of the propylene polymer compositions. The stiffness, which commonly decreases when toughness increases, may be affected depending on the type of ethylene-$C_3$-$C_{10}$-1-alkene copolymers. Changes in the other properties also depend on the type of ethylene-$C_3$-$C_{10}$-1-alkene copolymers. In particular, when ethylene/propylene copolymers are used, the resulting mixtures show good impact strength and good transparency. The use of ethylene/1-octene copolymers leads to mixtures which have, in particular, good impact strength and a good stiffness. Mixtures in which ethylene/1-hexene copolymers are added show in particular good impact strength and good notched impact toughness.

The propylene polymer compositions of the present invention are especially suitable for the production of films, fibers and moldings.

EXAMPLES

Examples 1 to 3 and Comparative Examples A to C

Examples 1 to 3 according to the present invention and comparative examples A to C were carried out using a Ziegler-Natta catalyst system which comprised a titanium-containing solid component prepared by the following method.

In a first step, a finely divided silica gel having a mean particle diameter of 30 μm, a pore volume of 1.5 cm$^3$/g and a specific surface area of 260 m$^2$/g was admixed with a solution of n-butyloctylmagnesium in n-heptane, using 0.3 mol of the magnesium compound per mol of SiO$_2$. The finely divided silica gel also had a mean particle size of the primary particles of 3-5 μm and voids and channels having a diameter of 3-5 μm, with the macroscopic proportion by volume of the voids and channels in the total particle being about 15%. The suspension was stirred at 95° C. for 45 minutes, then cooled to 20° C., after which 10 times the molar amount, based on the organomagnesium compound, of hydrogen chloride was passed in. After 60 minutes, the reaction product was admixed with 3 mol of ethanol per mol of magnesium while stirring continually. This mixture was stirred at 80° C. for 0.5 hours and subsequently admixed with 7.2 mol of titanium tetrachloride and 0.5 mol of di-n-butyl phthalate, in each case based on 1 mol of magnesium. The mixture was subsequently stirred at 100° C. for 1 hour, and the solid obtained in this way was filtered off and washed a number of times with ethylbenzene.

The resulting solid product was extracted with a 10% strength by volume solution of titanium tetrachloride in ethylbenzene at 125° C. for 3 hours. The solid product was then separated from the extractant by filtration and washed with n-heptane until the washings contained only 0.3% by weight of titanium tetrachloride.

The titanium-containing solid component comprised
3.5% by weight of Ti
7.4% by weight of Mg
28.2% by weight of Cl.

In addition to the titanium-containing solid component, triethylaluminum and dimethoxyisobutylisopropylsilane were used as cocatalysts in a manner similar to the teachings of U.S. Pat. No. 4,857,613 and U.S. Pat. No. 5,288,824.

In examples 1 to 3, the process was carried out in two stirring autoclaves which were connected in series and were each provided with a free-standing helical stirrer and each had a utilizable volume of 200 l. Both reactors contained an agitated fixed bed of finely divided propylene polymer.

The propylene was introduced in gaseous form into the first polymerization reactor and polymerized at a mean residence time, a pressure and a temperature as shown in table 1. The solid component described was metered in such an amount that the amount of material transferred from the first polymerization reactor to the second polymerization reactor corresponds, as an average over time, to the values given in table 1. This component was metered in together with the fresh propylene added to regulate the pressure. In example 3, ethylene was additionally added. Triethylaluminum (in the form of a 1 molar heptane solution) in an amount of from 60 to a maximum of 90 ml/h and isobutylisopropyldimethoxysilane (in the form of a 0.125 molar heptane solution) in an amount of from 70 to a maximum of 120 ml/h were likewise metered into the reactor as further catalyst constituents. To regulate the melt flow rate (MFR 230° C./2.16 kg in accordance with ISO 1133), hydrogen was also metered in. The concentrations of hydrogen and ethylene in the reaction gas were monitored by gas chromatography.

Polymer powder was removed from the reactor at intervals by briefly venting the reactor through a tube reaching down into it. The propylene homopolymer or copolymer formed in the first reactor was in this way introduced discontinuously together with the catalyst into an intermediate vessel and reacted there with isopropanol (in the form of a 0.5 molar heptane solution). The amount of isopropanol added was such that the weight ratio of the propylene homopolymer or copolymer obtained in the first reactor to the ethylene polymer formed in the second reactor corresponded to the values indicated in table 1 below. In the intermediate vessel, the pressure was in each case reduced to 1 bar and held for 30 seconds, and was then increased to 30 bar by injection of a gas mixture corresponding to the composition in the second reactor.

The polymer powder was then introduced discontinuously from the intermediate vessel into the second reactor. There, a mixture of ethylene and propylene was polymerized onto it at a total pressure, a temperature and a mean residence time corresponding to table 1.

The proportion of ethylene in the reaction gas in each case can be seen from table 1. The weight ratio of the polymer formed in the first reactor to that formed in the second reactor was controlled by means of the isopropanol added and is likewise indicated in table 1. The proportion of ethylene polymer formed in the second reactor is given by the difference of amount transferred and amount discharged according to the relationship (output from second reactor−output from first reactor)/output from second reactor.

The polymerization of comparative examples A to C was carried out by a method analogous to the polymerization of examples 1 to 3 using the same Ziegler-Natta catalyst system, but with lower concentrations of ethylene in the second reactor. Moreover, the propylene homopolymer or copolymer formed in the first reactor was transferred together with the catalyst directly from the first reactor into the second reactor. The isopropanol added to regulate the amount of ethylene-propylene copolymer formed in the second reactor was also added there (in the form of a 0.5 molar heptane solution).

The polymerization conditions of examples 1 to 3 and comparative examples A to C are shown in table 1. Some analytical characteristics of the polymers obtained in examples 1 to 3 are also reported in table 1.

TABLE 1

|  | Example 1 | Comparative example A | Example 2 | Comparative example B | Example 3 | Comparative example C |
|---|---|---|---|---|---|---|
| Reactor I |  |  |  |  |  |  |
| Pressure (I) [bar] | 32 | 32 | 32 | 32 | 20 | 20 |
| Temperature (I) [° C.] | 80 | 80 | 80 | 80 | 70 | 70 |
| Hydrogen (I) [% volume] | 6.8 | 7.3 | 2.2 | 1.8 | 1.5 | 1.4 |
| Ethylene (1) [% volume] | 0 | 0 | 0 | 0 | 1.2 | 2.0 |
| Amount of isobutylisopropyl-dimethoxysilane (0.125 M) [ml/h] | 103 | 104 | 103 | 100 | 69 | 71 |
| Amount of triethylaluminum (1 M) [ml/h] | 90 | 90 | 90 | 91 | 60 | 60 |
| Residence time (I) [h] | 1.5 | 1.5 | 1.5 | 1.5 | 2.3 | 2.3 |
| MFR (I) [g/10 min] | 120 | 150 | 20 | 13 | 9 | 9 |
| Amount of material transferred [kg/h] | 30 | 30 | 30 | 30 | 20 | 20 |
| Ethylene in PP(I) [% weight] | 0 | 0 | 0 | 0 | 2.4 | n.d. |
| Reactor II |  |  |  |  |  |  |
| Pressure (U) [bar] | 20 | 15 | 20 | 15 | 20 | 23 |
| Temperature (II) [° C.] | 70 | 70 | 70 | 70 | 70 | 70 |
| Hydrogen [% volume] | 15.5 | 1.7 | 14.2 | 1.1 | 1.5 | 1.2 |
| Ethylene [% volume] | 61.0 | 30 | 61.3 | 30 | 95.6 | 30 |
| Residence time [h] | 1.2 | 1.4 | 1.1 | 1.4 | 1.8 | 2.2 |

TABLE 1-continued

|  | Example 1 | Comparative example A | Example 2 | Comparative example B | Example 3 | Comparative example C |
|---|---|---|---|---|---|---|
| Output [kg/h] | 37.5 | 33 | 40 | 35 | 25 | 25 |
| Weight ratio PP (I):PE (II) | 4:1 | 10:1 | 3:1 | 6:1 | 4:1 | 4:1 |
| Proportion PE (II) [% weight] | 20 | 9 | 25 | 14 | 20 | 20 |
| Ethylene in PE (II) [% weight] | 99.5 | 65.5 | n.d. | n.d. | n.d. | n.d. |
| MFR (II) [g/10 min] | 28 | 30 | 6 | 6 | 4 | 3 |
| $M_w$ PP (I) [g/mol] | 207000 | n.d. | 238000 | n.d. | 273000 | n.d. |
| $M_w$ PE (II) [g/mol] | 349000 | n.d. | 428000 | n.d. | 1233000 | n.d. |

To the polymer powder obtained in the polymerization of the examples and comparative examples a standard additive mixture was added during granulation. Granulation was carried out using a twin-screw extruder ZSK 30 from Werner & Pfleiderer, at a melt temperature of 220° C. and a residence time of about 3 minutes, using a screw having a length/diameter ratio of 9:1. The propylene copolymer compositions obtained contained 0.05% by weight of Irganox 1010 (Ciba Specialty Chemicals), 0.05% by weight of Irgafos 168, (Ciba Specialty Chemicals), 0.1% by weight of calcium stearate and 0.24% by weight of Millad 3988 (bis-3,4-dimethylbenzylidene-sorbitol, Milliken Chemical).

The properties of the propylene polymer compositions are shown in table 2.

ditions reported in examples 1 to 3. The propylene copolymer compositions obtained therefrom contained 0.05% by weight of Irganox 1010 (Ciba Specialty Chemicals), 0.05% by weight of Irgafos 168 (Ciba Specialty Chemicals), 0.1% by weight of calcium stearate and 0.24% by weight of Millad 3988 (bis-3,4-dimethylbenzylidenesorbitol, Milliken Chemical) and in each case 10% by weight of the following ethylene-$C_3$-$C_{10}$-1-alkene copolymer.

In Example 4, the ethylene-$C_3$-$C_{10}$-1-alkene copolymer used was an ethylene/propylene copolymer having a Mooney viscosity (125° C.) of 33, a weight average molecular weight $M_w$ of 172 000 g/mol, $M_w/M_n$ of 2 and ethylene content of 69 mol %.

In Example 5, the ethylene-$C_3$-$C_{10}$-1-alkene copolymer used was an ethylene/1-hexene copolymer having a density of

TABLE 2

|  | Example 1 | Comparative example A | Example 2 | Comparative example B | Example 3 | Comparative example C |
|---|---|---|---|---|---|---|
| MFR (230° C./2.16 kg) [g/10 min]/ISO 1133 | 28 | 30 | 6 | 6 | 3 | 3 |
| Tensile E modulus [MPa]/ISO 527 | 1740 | 1640 | 1625 | 1282 | 1390 | 866 |
| Yield stress [MPa]/ISO 527 | 33 | 27 | 32 | 27 | 34 | 21 |
| Charpy impact strength (+23° C.) [kJ/m$^2$]/ISO 179-2/1eU | 83 | 72 | NF | NF | NF | NF |
| Charpy impact strength (0° C.) [kJ/m$^2$]/ISO 179-2/1eU | 55 | 36 | 190 | 158 | 147 | 135 |
| Charpy impact strength (−20° C.) [kJ/m$^2$]/ISO 179-2/1eU | 44 | 31 | 130 | 107 | 63 | 68 |
| Heat distortion resistance HDT B [° C.]/ISO 75-2 meth. | 109 | 99 | 96 | 70 | 83 | 64 |
| Vicat B softening temperature [° C.]/ISO 306 VST/B50 | 94 | 83 | 92 | 70 | 81 | 58 |
| Stress whitening (23° C.) [mm]/dome method | 9.2 | 14.8 | 7.9 | 14.3 | 0 | 6.7 |
| Stress whitening (60° C.) [mm]/dome method | 9.5 | 13.4 | 8.4 | 13.4 | 0 | 7.1 |
| Haze (1 mm) [%]/ASTM D 1003 | n.d. | n.d. | n.d. | n.d. | 39 | 38 |

NF: no fracture

The comparison between the examples according to the present invention and the comparative examples shows that at the same flowability and at approximately the same or somewhat better toughness, the propylene polymers of the present invention display a significantly higher stiffness combined with better heat distortion resistance and better stress whitening behavior.

Examples 4 to 6

In addition to the standard additive mixture described above, the polymer powder obtained in example 3 was mixed during granulation also with an ethylene-$C_3$-$C_{10}$-1-alkene copolymer. Granulation was carried out under the same con- 0.906 g/cm$^3$, an MFR (190° C./21.6 kg) of 22 g/10 min, a weight average molecular weight $M_w$ of 114000 g/mol, $M_w/M_n$ of 2.4 and 1-hexene content of 3 mol %.

In Example 6, the ethylene-$C_3$-$C_{10}$-1-alkene copolymer used was an ethylene/1-octene copolymer having a density of 0.870 g/cm$^3$, an MFR (190° C./2.16 kg) of 1 g/10 min, a weight average molecular weight $M_w$ of 152 000 g/mol, $M_w/M_n$ of 2.2 and 1-octene content of 24 mol %.

The properties of the propylene polymer compositions of examples 4 to 6 are reported in table 3, together with the properties of the propylene polymer composition of example 3.

TABLE 3

|  | Example 3 | Example 4 | Example 5 | Example 6 |
| --- | --- | --- | --- | --- |
| MFR (230° C./2.16 kg) [g/10 min]/ ISO 1133 | 3 | 2 | 2 | 2 |
| Tensile E modulus [MPa]/ISO 527 | 1390 | 1068 | 1084 | 1140 |
| Stress at Yield [MPa]/ISO 527 | 34 | 26 | 26 | 27 |
| Charpy impact strength (+23° C.) [kJ/m$^2$]/ISO 179-2/1eU | NF | NF | NF | NF |
| Charpy impact strength (0° C.) [kJ/m$^2$]/ISO 179-2/1eU | 147 | NF | NF | NF |
| Charpy impact strength (−20° C.) [kJ/m$^2$]/ISO 179-2/1eU | 63 | 101 | 161 | 107 |
| Charpy notched impact strength (+23° C.) [kJ/m$^2$]/ISO 179-2/1eA | 10.7 | 9.5 | 13.7 | 7.7 |
| Haze (1 mm) [%]/ ASTM D 1003 | 39 | 45 | 69 | 62 |

Comparison of examples 4 to 6 with example 3 shows that the addition of the ethylene-$C_3$-$C_{10}$-1-alkene copolymers increases the impact strength of the propylene polymer compositions of the invention, without significantly impairing the other properties. Example 4 gives a slightly lower transparency than example 3, while in example 6 the stiffness decreases to a lesser degree. Example 5 displays a significant increase in impact strength and particularly in notched impact strength.

Analysis

The production of the test specimens required for the applications-related tests and the tests themselves were carried out in accordance with the standards indicated in table 3.

The proportion of the ethylene polymer formed in the second reactor was determined by means of the mass balance and also analytically by means of CRYSTAF (Crystallization Analysis Fractionation) as described by B. Monrabal, J. Appl. Polym. Sci. 52 (1994), 491-499. Here, separation is carried out by means of precipitation by crystallization from a polymer solution as the temperature decreases. The precipitated fractions are separated off pseudocontinuously, i.e. stepwise after cooling steps of 3-5° C. in each case, and the polymer content of the remaining solution is determined. 1,2-Dichlorobenzene was used as solvent, polymer solutions having a concentration of 0.03% by weight. Cooling was carried out in a temperature range from 95 to 30° C. at a rate of 0.1° C./min. An IR detector at 2875 cm$^{-1}$ was used for determining the polymer content of the solution.

To determine analytical data on product fractions, the polymers prepared were isolated preparatively by means of fractional crystallization by sequential cooling of a xylene solution. For this purpose, the temperature at which the fractions are separated most readily was determined from the continuous CRYSTAF (minimum in the differential curve of dissolved proportion of polymer versus temperature). The polymer sample was then dissolved by heating in xylene, the solution was cooled to this temperature, the precipitated fraction was separated off and the remaining solution was subsequently cooled to 20° C. and the precipitated fraction was again separated off. A fraction consisting predominantly of ethylene polymer and a fraction consisting predominantly of propylene homopolymer or copolymer were obtained.

The weight average molecular weight Mw and the molecular weight distribution $M_w/M_n$ were determined by gel permeation chromatography (GPC) at 145° C. in 1,2,4-trichlorobenzene using a GPC apparatus 150C from Waters. Evaluation of the data was carried out using the software Win-GPC from HS-Entwicklungsgesellschaft für wissenschaftliche Hard-und Software mbH, Oberhilbersheim. The columns were calibrated by means of polypropylene standards having molecular weight of from 100 to 10$^7$ g/mol.

The heat distortion resistance HDT B was carried out in accordance with ISO 75-2 meth. B using injection-molded test specimens having dimensions of 120×10×4 mm.

The E modulus and the stress at yield were measured in accordance with ISO 527-2:1993. The test specimen of type 1, having a total length of 150 mm and a parallel region of 80 mm, was injection molded at a melt temperature of 250° C. and a tool surface temperature of 30° C. To allow after-crystallization to occur, the test specimen was stored for 7 days under standard conditions of temperature and humidity, viz. 23° C./50% atmospheric humidity. Testing was carried out using a Zwick-Roell type Z022 tester. The displacement measurement system in the determination of the E modulus had a resolution of 1 μm. The strain rate in the determination of the E modulus was 1 mm/min, otherwise 50 nm/min. The elastic limit in the determination of the E modulus was in the range 0.05-0.25%.

The stress whitening behavior was assessed by means of the dome method. In the dome method, the stress whitening is determined by means of a falling dart apparatus in accordance with DIN 53443 part 1, using a falling dart having a mass of 250 g, an indenter having a diameter of 5 mm and a dome radius of 25 mm. The drop was 50 cm. The test specimen used was an injection-molded round disk having a diameter of 60 mm and a thickness of 2 mm. The test specimen was injection molded at a melt temperature of 250° C. and a tool surface temperature of 30° C. Tests were carried out at 23 and 60° C., with each test specimen being subjected to only one test. In the test, the test specimen was first laid on a support ring without being clamped into it, and the falling dart was subsequently released. Five test specimens were tested in each case and the mean was calculated. The diameter of the visible stress whitening region is reported in mm and was determined by measuring this region on the side of the round disk opposite the impact in the flow direction and perpendicular thereto and calculating the mean of the two values.

The determination of the Haze values was carried out in accordance with the standard ASTM D 1003. The values were determined on specimens containing 2400 ppm of Millad 3988. The test specimens were injection-molded plates having an edge length of 6×6 cm and a thickness of 1 mm. The test specimens were injection molded at a melt temperature of 250° C. and a tool surface temperature of 30° C. After storage for 7 days at room temperature to allow after-crystallization to occur, the test specimens were clamped in the clamping device in front of the inlet opening of a Hazegard System XL 211 from Pacific Scientific and the measurement was subsequently carried out. Testing was carried out at 23° C., with each test specimen being examined once in the middle. Five test specimens were tested in each case and the mean was calculated.

The invention claimed is:

1. A process for preparing a propylene polymer composition in an at least two-stage process, wherein,
   in a first polymerization stage, a propylene homopolymer is prepared by polymerization, and
   in a second polymerization stage, ethylene and propylene are polymerized to give an ethylene/propylene copolymer comprising more than 97% to 99.5% by weight of ethylene,
   wherein the amount of the ethylene/propylene copolymer in the propylene polymer composition ranges from 10 to 50% by weight, and the propylene polymer composition comprises a melt flow rate, MFR, from 2 to 50 g/10 min. in accordance with ISO 1133 at 230° C. and 2.16 kg.

2. The process as claimed in claim 1, wherein the propylene homopolymer prepared in the first polymerization stage comprises a melt flow rate, MFR, from 5 to 150 g/10 min, in accordance with ISO 1133 at 230° C. and 2.16 kg.

3. The process as claimed in claim 1, wherein both the first and the second polymerization stages are carried out in gas phase.

4. The process as claimed in claim 3, wherein in the first polymerization stage the polymerization is carried out at a pressure from 10 to 50 bar and a temperature from 50 to 100° C., in presence of a polymerization-active catalyst system; the propylene homopolymer obtained in the first polymerization stage together with the catalyst system is introduced into an intermediate vessel, depressurized to less than 5 bar for from 0.01 to 5 minutes and the pressure in the intermediate vessel is then increased from 5 to 60 bar by injection of a gas mixture whose composition differs from the composition of the gas mixture of the first polymerization stage; the propylene homopolymer together with the catalyst is subsequently transferred to the second polymerization stage and further polymerized at a pressure from 10 to 50 bar and a temperature from 50 to 100° C.

5. A process for preparing a polymer composition comprising (1) preparing a propylene polymer composition in an at least two-stage process, wherein,
   in a first polymerization stage, a propylene homopolymer is prepared by polymerization, and
   in a second polymerization stage, ethylene and propylene are polymerized to give an ethylene/propylene copolymer comprising more than 97% to 99.5% by weight of ethylene,
   wherein the amount of the ethylene/propylene copolymer in the propylene polymer composition ranges from 10 to 50% by weight, and the propylene polymer composition comprises a melt flow rate, MFR, from 2 to 50 g/10 min, in accordance with ISO 1133 at 230° C. and 2.16 kg; and
   (2) subsequently mixing an ethylene-$C_3$-$C_{10}$-1-alkene copolymer comprising a crystallinity lower than the ethylene/propylene copolymer formed in the second polymerization stage.

6. A propylene polymer composition obtained by an at least two-stage process, wherein,
   in a first polymerization stage, a propylene homopolymer is prepared by polymerization, and
   in a second polymerization stage, ethylene and propylene are polymerized to give an ethylene/propylene copolymer comprising more than 97% to 99.5% by weight of ethylene,
   wherein the amount of the ethylene/propylene copolymer in the propylene polymer composition ranges from 10 to 50% by weight, and the propylene polymer composition comprises a melt flow rate, MFR, from 2 to 50 g/10 min, in accordance with ISO 1133 at 230° C. and 2.16 kg.

7. A method for producing films, fibers or moldings comprising extruding or molding a propylene polymer composition to form the films, fibers or moldings, the propylene polymer composition obtained by an at least two-stage process, wherein,
   in a first polymerization stage, a propylene homopolymer is prepared by polymerization, and
   in a second polymerization stage, ethylene and propylene are polymerized to give an ethylene/propylene copolymer comprising more than 97% to 99.5% by weight of ethylene,
   wherein the amount of the ethylene/propylene copolymer in the propylene polymer composition ranges from 10 to 50% by weight, and the propylene polymer composition comprises a melt flow rate, MFR, from 2 to 50 g/10 min, in accordance with ISO 1133 at 230° C. and 2.16 kg.

8. A film, fiber or molding comprising a propylene polymer composition, the propylene polymer composition obtained by a process, wherein, the process comprises at least two-stages, and
   in a first polymerization stage, a propylene homopolymer is prepared by polymerization, and
   in a second polymerization stage, ethylene and propylene are polymerized to give an ethylene/propylene copolymer comprising more than 97% to 99.5% by weight of ethylene; and
wherein the amount of the ethylene/propylene copolymer in the propylene polymer composition ranges from 10 to 50% by weight, and the propylene polymer composition comprises a melt flow rate, MFR, from 2 to 50 g/10 min in accordance with ISO 1133 at 230° C. and 2.16 kg.

9. A propylene polymer composition obtained by a process comprising (1) preparing a propylene polymer composition in an at least two-stage process, wherein,
   in a first polymerization stage, a propylene homopolymer is prepared by polymerization, and
   in a second polymerization stage, ethylene and propylene are polymerized to give an ethylene/propylene copolymer comprising more than 97% to 99.5% by weight of ethylene,
   wherein the amount of the ethylene/propylene copolymer in the propylene polymer composition ranges from 10 to 50% by weight, and the propylene polymer composition comprises a melt flow rate, MFR, from 2 to 50 g/10 min, in accordance with ISO 1133 at 230° C. and 2.16 kg; and
   (2) subsequently mixing an ethylene-$C_3$-$C_{10}$-1-alkene copolymer comprising a crystallinity lower than the ethylene/propylene copolymer formed in the second polymerization stage.

10. A film, fiber or molding comprising a propylene polymer composition obtained by a process comprising (1) preparing a propylene polymer composition in an at least two-stage process, wherein, in a first polymerization stage, a propylene homopolymer is prepared by polymerization, and in a second polymerization stage, ethylene and propylene are polymerized to give an ethylene/propylene copolymer comprising more than 97% to 99.5% by weight of ethylene, wherein the amount of the ethylene/propylene copolymer in the propylene polymer composition ranges from 10 to 50% by weight, and the propylene polymer composition comprising a melt flow rate, MFR, from 2 to 50 g/10 min, in accordance with ISO 1133 at 230° C. and 2.16 kg; and (2) subsequently mixing an ethylene-$C_3$-$C_{10}$-1-alkene copolymer comprising a crystallinity lower than the ethylene/propylene copolymer formed in the second polymerization stage.

* * * * *